Figure 1:
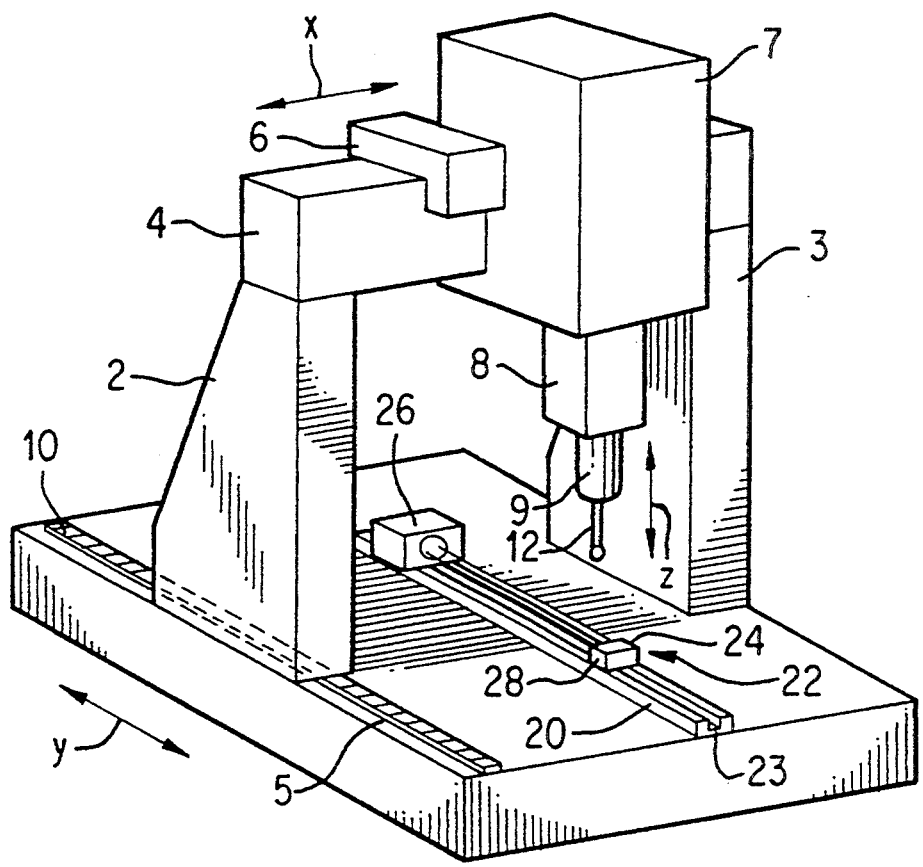

United States Patent [19]

Taylor

[11] Patent Number: 5,446,545
[45] Date of Patent: Aug. 29, 1995

[54] METHOD OF AND APPARATUS FOR CALIBRATING MACHINES INCLUDING A MEASURING PROBE AND A MEASURING APPARATUS

[75] Inventor: Benjamin R. Taylor, Trelleck, United Kingdom

[73] Assignee: Renishaw plc, Gloucestershire, United Kingdom

[21] Appl. No.: 212,842

[22] Filed: Mar. 15, 1994

[30] Foreign Application Priority Data

Mar. 25, 1993 [GB] United Kingdom ............... 9306139

[51] Int. Cl.$^6$ .................................................. G01B 9/02
[52] U.S. Cl. ..................................... 356/358; 356/363
[58] Field of Search .................. 356/358, 357, 363, 72

[56] References Cited

U.S. PATENT DOCUMENTS

| | | | |
|---|---|---|---|
| 3,582,211 | 10/1969 | McClure | 356/363 |
| 4,939,678 | 7/1990 | Beckwith, Jr. | 356/375 |
| 4,950,079 | 8/1990 | McMurtry et al. | 356/358 |
| 5,007,006 | 4/1991 | Taylor et al. | 356/358 |

FOREIGN PATENT DOCUMENTS 0053199  6/1982  European Pat. Off. ............ 356/358

*Primary Examiner*—Samuel A. Turner
*Attorney, Agent, or Firm*—Oliff & Berridge

[57] ABSTRACT

In a method of calibrating the measuring performance and apparatus for a machine, the conventional physical length bar is simulated by moving a retro-reflector to various positions along a track. A laser beam of an interferometer is aligned with the track using the retro-reflector at two extreme positions in order to define a measurement axis for the calibration. The retro-reflector has a part-spherical surface on its rear face which is centered on the nodal point of the retro-reflector. By contacting the reference surface with a probe on the machine at several points, the center of the sphere at the two positions of the retro-reflector can be calculated and hence the measurement axis is defined in the machine frame of reference. Measurements are taken with the interferometer of the position of the retro-reflector at several points on the measurement axis, and at each point the measuring probe is brought into contact with the spherical surface of retro-reflector (preferably at the intersection of the measurement axis and the surface) to make a second measurement of the retro-reflector's position. The accurate measurement of the interferometer is compared to the machine's measurement to determine the machine error. Many different length bars can be easily simulated by this method, and bars of different materials can be simulated by using the coefficient of linear expansion of commonly used materials to convert the measured distance into a length measurement of a bar of that material corrected to standard temperature and pressure.

13 Claims, 3 Drawing Sheets

METHOD OF AND APPARATUS FOR CALIBRATING MACHINES INCLUDING A MEASURING PROBE AND A MEASURING APPARATUS

The present invention relates to machine calibration and relates in particular to a new method of and apparatus for calibrating the measuring performance of a machine.

It is known to calibrate the movements of machines by simultaneously measuring the distance moved by a machine component e.g. the spindle, both by reading the machine scales and by measuring the actual movement with a laser interferometer. The two measurements are compared and the difference noted as an error. By repeating the process for a range of movements along the three orthogonal machine axes, or along vectors inclined to the machine axes, an error map of the machine movements can be built up, and used to correct measurements taken by the machine.

Such error maps however, do not provide complete information about the errors in the actual measurements made by the machine.

Presently the measuring performance of a coordinate measuring machine is calibrated using a length bar manufactured to the highest possible accuracy. The bar is placed on the machine and measured, the difference between the actual length and the measured length being noted and used to correct future measurements.

In order to obtain a full range of measurements a range of length bars is needed, each of which is expensive because of the accuracy with which it has to be made and measured.

Also, in accordance with international standards, it is usual to reference all measurements made to a standard temperature. Thus the quoted length of the length bar will be its length at the standard temperature. If it is measured at a temperature other than the standard temperature, its actual length is calculated from the coefficient of linear expansion of the material from which it is made. But, because compositions of materials are different, the coefficient of linear expansion of any particular length bar may not be the quoted value and this may also give rise to errors in the measurement.

One object of the present invention is to provide apparatus for, and a method of calibrating the measuring performance of a machine with greater accuracy and less cost than the method described above using a physical length bar.

According to one aspect of the present invention a measurement artifact is provided in place of the known physical length bar. The artifact, which may be an optical artifact, for example a reflector is mounted for movement over a variety of distances on a track mounted on or in association with the machine. The distance moved between any two positions of the artifact is measured by an independent measurement apparatus, for example, a laser interferometer which provides an accurate length measurement between the two positions. A second measurement of the length between the same two positions of the artifact is made by the machine using a measuring probe and the two measurements are compared. By repeating this process over a large number of lengths, a calibration for the whole working volume of the machine can be achieved.

The actual length measurements taken by the interferometer are equivalent to having measured the known lengths of many extremely accurate physical length bars, but are all made using the same artifact at different positions on the track.

According to another aspect, the invention comprises a measurement artifact for use in the above-described method.

The machine measurements are taken using a measuring probe on the machine. The probe may be made to contact the artifact along the same measurement vector as that along which the laser interferometer has taken its measurements, or alternatively at the same point on the artifact each time. The measurements made by the interferometer and the probe on the machine are preferably synchronised.

In order to correlate the readings of both the laser interferometer and the measuring machine, there must be a first reference point associated with the artifact and which has a known relationship with the measurement axis of the interferometer. Further, the artifact must have at least one reference surface which is available to be contacted by the probe, and on which can be defined a second reference point which has a fixed known relationship with the first reference point.

In a preferred embodiment of the invention the artifact is a retro-reflector. The retro-reflector has a nodal point through which the measurement axis of the interferometer passes. For this reason the nodal point of the retro-reflector is taken as the first reference point to be measured.

In order that the machine can measure the position of the nodal point of the retro-reflector, the retro-reflector is modified to include one or more surfaces which are very accurately positioned relative to the nodal point.

Thus in a preferred embodiment of the invention the retro-reflector is provided with a spherical surface accurately centered on the nodal point, and the second reference point is defined as the point of intersection of the measurement axis of the interferometer with the spherical surface.

For the purposes of this specification the nodal point of a retro-reflector is defined as that point in space about which the retro-reflector can pitch or yaw without significantly affecting the distance reading made by the interferometer.

Thus it can be seen that the invention produces an optical length bar of a length which is both accurate within the measurement accuracy of the interferometer, and variable in length within the range of movements of the retro-reflector on its track, and which can therefore simulate many fixed physical length bars which are the current standard for calibrating the measuring performance of a measuring machine.

By using a retro-reflector and relating all measurements to the nodal point, pitching and yawing movements of the retro-reflector on its track do not introduce significant measurement errors in the interferometer readings.

Also by providing a spherical surface on the back of the retro-reflector which is centred on the nodal point, the position of the nodal point along the track can be determined by the machine in a single measurement by moving the probe along the measurement axis or parallel thereto, and recording the position of the machine when the probe makes contact with the spherical surface.

Other artifacts, may however, be used, for example a plane mirror with a spherical surface on the back centred on a measuring point of the plane mirror.

As a further feature of the invention the laser interferometer software may be programmed with the coefficients of linear expansion of various commonly used materials, so that the desired calibration length between the two positions of the artifact can be equated to lengths of different materials at different temperatures, and referenced back to the standard temperature.

When using an optical artifact and a laser interferometer an alternative method of measurement may be used which will avoid errors due to any relative movement of the laser interferometer and the machine bed on which it is mounted. In the alternative method as part of the pre-calibration process the probe is made to contact a point on the interferometer and a point on the artifact in its first position so that the distance d between these two points can be determined from the machine scales. The interferometer reading corresponding to the distance of the artifact in its first position is set to zero, and the machine scale readings with the probe in contact with a reference point on the interferometer is set to zero, and for all future measurements of the position of the artifact, the measured distance between the two points is subtracted from the machine scale readings to provide the true machine measurement of the position of the artifact.

The method of the present invention is applicable to machines with static or movable work tables.

Figure 2:
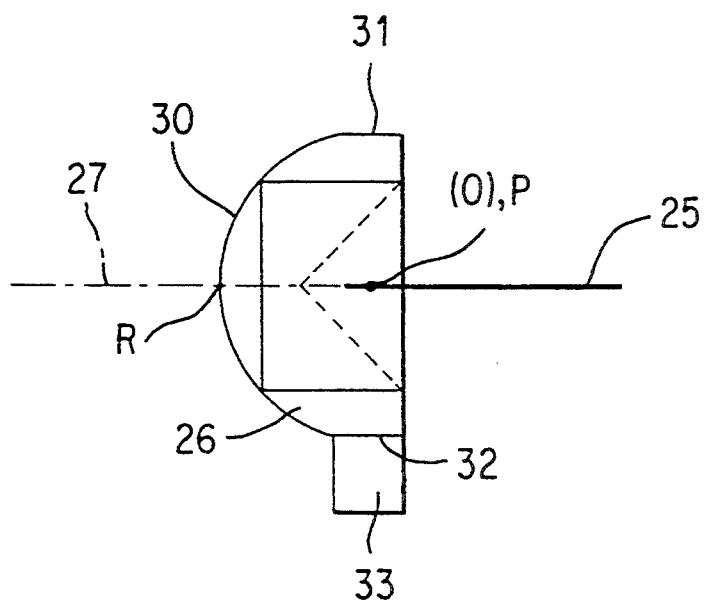
Figure 3:
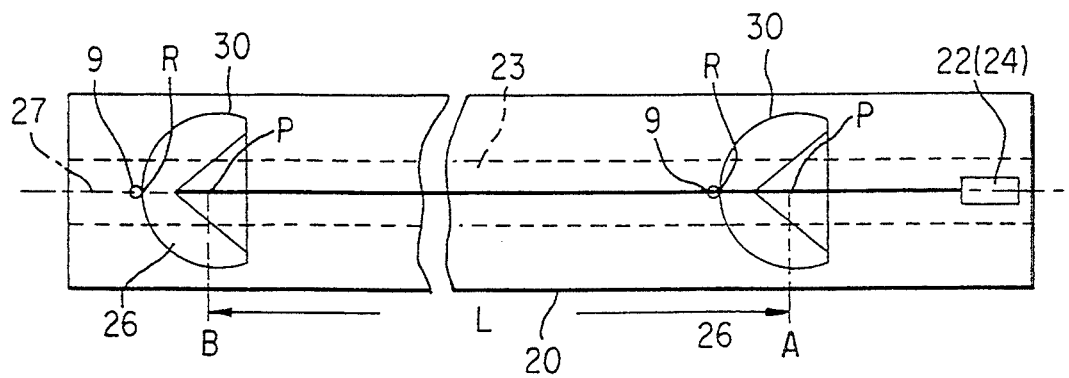
Figure 6:
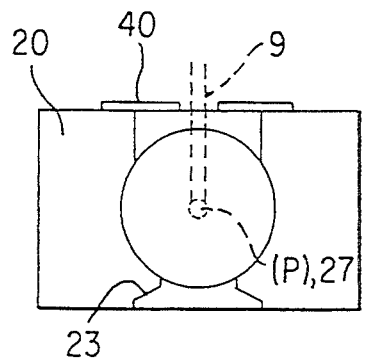
Figure 8:
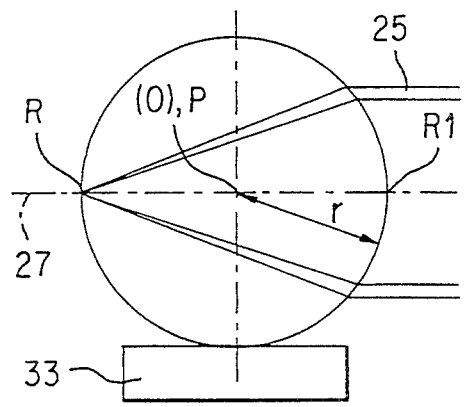
Figure 7:
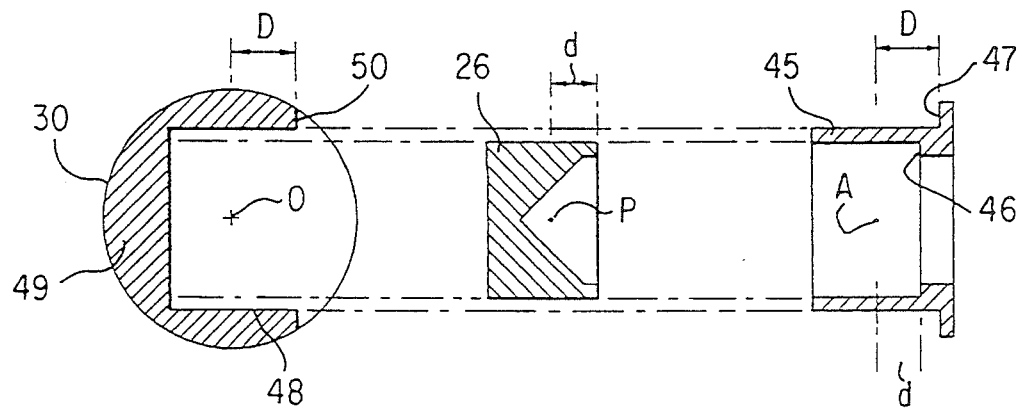
Figure 4:
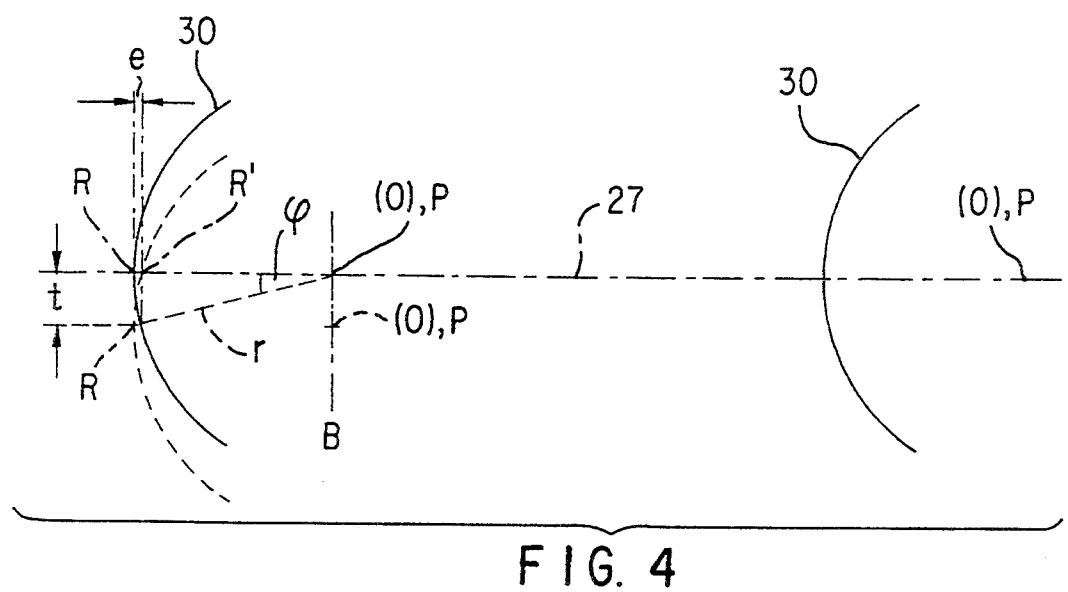
Figure 5:
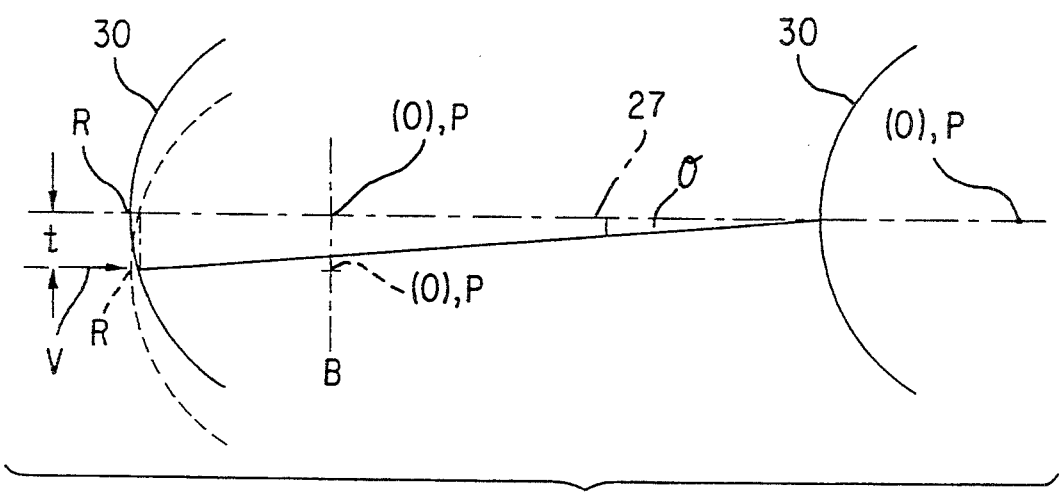
Figure 9A:
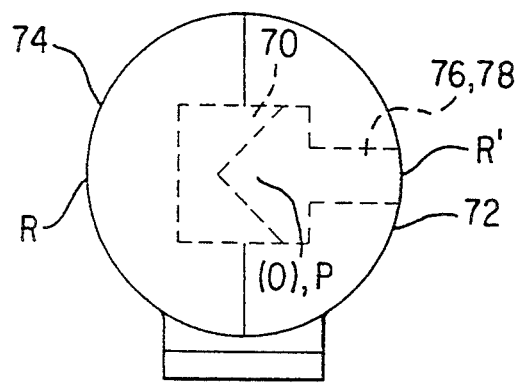
Figure 9B:
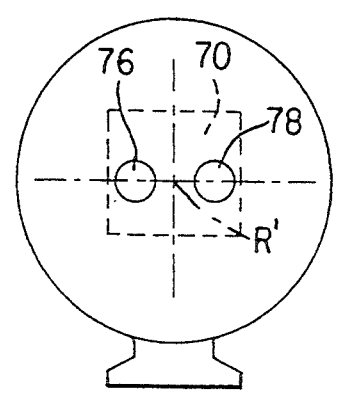

The invention will now be more particularly described, by way of example only with reference to the accompanying drawings in which:

FIG. 1 is a diagrammatic representation of a machine to be calibrated showing the artifact of the present invention during the calibration of the machine, FIG. 2 shows a corner cube retro-reflector modified in accordance with the present invention, FIG. 3 is a plan view of the track of the present invention and shows the steps in the method of calibrating the machine, FIG. 4 is an enlarged side view of the artifact of FIG. 3 at position B, FIG. 5 is a diagrammatic side view of the track and the artifact using an alternative calibration method, FIG. 6 illustrates an alternative construction of the track of the present invention, FIG. 7 illustrates an exploded view of a retro-reflector with a spherical rear surface, FIG. 8 shows an alternative form of artifact of the invention, and FIGS. 9a and 9b show a further alternative artifact of the present invention.

Referring to FIG. 1 there is illustrated a coordinate measuring machine having a fixed work table 1 on which a workpiece to be measured may be mounted, and a coordinate framework including uprights 2 and 3 linked by a cross beam 4. The upright 2 runs on an air bearing on a track 5 and the upright 3 runs on an air bearing on the worktable 1 to provide motion as indicated by the arrow y (denoted the y-axis). The cross beam supports a carriage 6 on air bearings to allow movement of the carriage 6 as indicated by the arrow x (denoted the x-axis). The carriage 6 in turn supports a pillar 7 within which the machine spindle 8 is supported on further air bearings to move as shown by the arrow z (denoted the z-axis). The spindle normally carries a measuring probe 9.

It is to be understood however, that the machine may be of the type in which the table is movable and the uprights are fixed, the important thing being that relative movement takes place between the spindle 8 and the table 1.

It can be seen therefore that the measuring probe can be positioned anywhere within the working envelope of the machine.

Each of the supports for the moving elements of the machine carries a scale 10 and scale reader (not shown) which constitute a first measuring device whereby the position of the probe in terms of its distance from a datum point along each of the three axes x,y and z can be determined.

Workpieces placed on the table are measured by bringing the probe into contact with the workpiece to produce a signal when the probe stylus 12 contacts a surface of the workpiece and to cause the machine controller (not shown) to latch the outputs of the scale. When sufficient readings have been taken the dimensions of the workpiece can be determined. Such workpiece measuring processes are conventional.

In order to calibrate the machine in accordance with the invention, a track 20 is set up on the machine extending in the desired calibration direction. The calibration direction may be along any axis of the machine or inclined to one or more axes. The track includes a guide for the optical calibration artifact. In the present example the guide takes the form of a square slot 23 running the whole of the length of the track. The slot may be any convenient shape e.g. square or dovetail, but is shown in this example as a square slot.

A laser interferometer 22 is provided which includes a laser beam generator 24 set up to direct a laser beam 25 along the track. The laser beam generator may be a conventional laser mounted on or off the machine, but is preferably a diode laser mounted directly on the track, or a beam collimator mounted on the track and connected by a fibre optical cable to a remote laser.

A corner cube retro-reflector 26 is mounted for movement along the track and reflects the laser beam 25 back to the interferometer 28 which includes conventional optical components and a detector system.

A corner cube retro-reflector is chosen as the optical artifact because it has the advantageous property that small pitch and yaw movements which it may make about a nodal point on the laser beam axis during its movement along the track, will not significantly affect the distance measurement made by the laser interferometer. The nodal point P of a retro-reflector can be calculated from the construction of the retro-reflector, and an axis of symmetry 27 of the interferometer can be established which extends parallel to the beam 25 and through the nodal point P. Since the axis of symmetry 27 of the interferometer will form the measurement axis of the interferometer and the nodal point P has a known fixed relationship with the measurement axis, the nodal point P of the retro-reflector is assigned as the first reference point of the artifact.

The retro-reflector is additionally modified in accordance with the invention as shown in FIG. 2, to have a spherical surface 30 on its rear face. The center O of the spherical surface is made to coincide with the nodal point P. The retro-reflector may optionally be provided with accurately positioned surfaces 31,32 on either side to assist in determining the position of the center of the sphere by measurement with a probe on the machine. The surface 30 forms the reference surface, and since all points on this surface are at a fixed distance, equal to the radius of the sphere, from the nodal point P, a point R on the surface where the measurement axis intersects the surface is designated as the second reference point on the artifact.

A square projection 33 is provided on the bottom of the retro-reflector and which is dimensioned to be a sliding fit in the slot 23 of the track 22.

FIG. 3 shows the apparatus set up for calibrating the machine. The basic movements and measurements required for the calibration using one of the methods of the invention are described below. The moves are described separately for a clear understanding of the invention and it is to be understood that some of the initial alignment and measurement steps may be combined into the calibration step.

The modified retro-reflector 26 is mounted on the track 20. The track is lined up in the direction in which calibration is desired. The laser interferometer is lined up along the track and the retro-reflector is moved. The alignment of the laser is adjusted until at any two positions of the retro-reflector along the track, the outgoing laser beam is reflected back to the interferometer. This establishes the measurement axis 27 of the laser interferometer between any two positions of the retro-reflector, thereby defining both the line along which the first reference point P of the artifact moves, and the second reference point R where this line intersects the spherical surface 30.

The alignment may be carried out by eye if the distance is long enough, otherwise an electronic aid such as a photodetector, for example a quad cell, may have to be used.

The machine equipped with a measuring probe 9 is then used to take measurements on the spherical surface 30, or on the other surfaces 31,32 specially formed on the retro-reflector, in order to determine the transverse positions of the centre O of the spherical reference surface on the retro-reflector at two positions along the track. Since the artifact has been made so that the center O of the spherical surface and the nodal point P coincide, this step establishes the measurement axis 27 of the interferometer in the machine frame of reference. The machine can then be programmed to make its measurement of the second reference point by moving the probe along this axis 27.

The last stage of the calibration is to select a required calibration length L between two points A and B on the track 20. The length L is then measured by moving the artifact to one of the points, and while moving the probe along the measurement axis 27, making a single touch with the probe at the second reference point R to determine its position along the track in the machine frame of reference. The artifact is then moved to the second point on the track, and the length of the movement is measured by the interferometer. At the second point, a second touch on the artifact is made with the probe at the second reference point R.

Because only a single touch needs to be made with the probe at the second reference point on the spherical surface of the artifact at each point on the track to establish the position of the nodal point, the machine errors are minimized.

The track is shown as having a square slot along its length into which a square base on the retro-reflector is fitted. Such a system, while having the advantage of simplicity, may give rise to errors in the measurements if the retro-reflector makes pitching, rolling or yawing movements as it progresses along the track. These movements will be centred on the track and not on the nodal point P and will cause both a rotational movement and a translational movement of the retro-reflector about axis 27.

Rotational movements of the retro-reflector about the axis 27 will have no effect on the length measurements made by either the interferometer or the machine. However, any translation of the retro-reflector as it moves along the track, while not affecting the measurements made by the laser interferometer will cause the probe moving along the axis 27 to contact the spherical reference surface 30 at a point R' offset from the second reference point R.

This is illustrated in FIG. 4 from which it can be seen that after a transverse displacement t of the retro-reflector to the position shown in dotted lines, the probe will measure to the point R' along the axis 27 which will be shorter by a distance e giving rise to a cosine error signal equal to r cos $\phi$ where r—r is the radius of the spherical surface. For small values of t this type of cosine error will not be significant, but ensuring that t is sufficiently small may require an accurately constructed track which would add to the expense of the overall apparatus.

FIG. 5 illustrates a variation in the method of performing the calibration. This method reduces any error present due to transverse movements of the artifact as it moves along the track, and thus allows a less accurately made track to be used. In this variation the direction of the axis 27 is established as before by aligning the laser with the track. This determines the two reference points P and R as shown. If, when the retro-reflector is moved to its position B at the end of a measurement length L, there is a translation t of the retro-reflector because of inaccuracies in the track 20, the two reference points P and R will have moved to the positions shown in the dotted lines. Instead of moving the probe along the axis 27 into contact with the reference surface, the machine is programmed in the alternative method to find the new position of the center O of the sphere by touching the reference surface at three positions. The machine then makes the distance measurement by approaching the reference surface along a vector V through the new center O and parallel to the axis 27 so that contact with the surface is again made at the second reference point R.

An alternative form of track is shown in FIG. 6 with which the retro-reflector can be centred on the axis of symmetry of the laser interferometer to ensure that any rotations of the retro-reflector are more nearly centred on the nodal point. The slot 23 is shown in this example having a dovetail shape. As a further benefit the laser beam is enclosed within the track to reduce the effects on the laser beam of air movements. A flexible cover 40 may be provided through which the probe 9 extends to complete the enclosure.

As a further refinement, the laser interferometer system may include an air refractometer, which ensures correction of the wavelength of the laser light for any changes in the refractive index of the air due to changes in ambient air conditions. A suitable air refractometer is described and claimed in our European Patent Application No. 508583.

It can be seen that the above-described calibration system provides a low cost alternative to the expensive physical length bars presently used. The track need not be made very accurately because rotations of the retro-reflector about the nodal point will not affect the accuracy of the laser interferometer measurements. The effect of any translations of the retro-reflector on the single measurement made by the probe at each position is also reduced to an insignificant cosine error.

One additional benefit of the invention is that the software which calculates the actual length of the optical length bar from the fringe count of the interferometer can also be programmed to include the coefficients of linear expansion of all of the materials likely to be measured by the machine. In this way the interferometer can produce a measurement length representative of different materials at different temperatures from the same distance reading and referenced accurately back to a standard temperature. This information can then be used to correct the readings from the machine to the same standard.

For example, the measurement made by the interferometer is the distance L moved by the artifact. It is not the length of a metal bar. If a correction back to a standard temperature has to be made, the present invention allows for any material to be selected and the standard quoted coefficient of linear expansion for that material to be used to determine what would be the actual length of a bar of the material of nominal length L at the standard temperature. The resulting calculated value does not therefore suffer from the uncertainty which is present when the same calculation is done after having calibrated the machine using a standard length bar, the material of which may not have exactly the same chemical composition as that for which the standard coefficient of linear expansion is quoted.

Thus not only does the present invention allow for this uncertainty to be eliminated from the calibration, but it enables the apparatus to provide values for various calibrated lengths of any number of materials to be provided from the single artifact resulting in significant cost savings.

The combined retro-reflector and spherical surface can be made as shown in FIG. 7. The retro-reflector 26 is made and measured to determine the position of the nodal point P. The retro-reflector is then introduced from one end into a sleeve 45 which has internal and external abutments 46 and 47 respectively. The internal abutment 46 is positioned to ensure that distance d of the nodal point P of the retro-reflector from its front face is at a precise position A at a distance D from the external abutment 47.

The sleeve is dimensioned to be inserted into a radial bore 48 in a sphere 49 which is to form the external surface 30 of the retro-reflector. The sphere has a front face 50 which is precisely located at the same distance D from the centre O of the sphere. These dimensions ensure that in the assembled artifact the center of the sphere coincides with the nodal point P.

Although a retro-reflector has been selected as the reflector of the optical artifact in the preferred embodiment, a plane mirror could be used. However, significantly greater care has to be exercised with a plane mirror to ensure alignment of the laser beam through the center of a spherical reference surface to which the mirror is attached.

Other forms of artifact are illustrated in FIGS. 8, 9a and 9b. Referring to FIG. 8 an artifact is shown in the form of a glass sphere. By choosing the material of the glass to have a refractive index of 2 at a wavelength of light of 780 nanometers, the sphere behaves as a retro-reflector having its nodal point P at the center of the sphere O. Such an artifact is capable of use with a laser diode which provides light having a wavelength of 780 nm.

Glass having the appropriate refractive index is manufactured by the German company Schott Glaswerke of Mainz.

Such a sphere will focus the laser beam 25 to a point on the rear surface of the sphere so that this point can be designated as the second reference point R at a fixed radius r from the nodal point P. The sphere also provides a third reference point $R_1$ available to the probe on the front face of the sphere and which is also at the same fixed distance r to the nodal point. Hence, in use, distances can be measured with the probe moving in either direction if required by a standard technique for calibration.

Another artifact which allows for calibration of a machine with the probe moving in either direction may be made by modifying a conventional retro-reflector as shown in FIGS. 9a and 9b. The artifact is formed by adding to a retro-reflector 70 front and rear spherical surfaces 72,74 having their centers at the nodal point. The laser beam is arranged to enter and leave the retro-reflector through apertures 76,78 to either side of the front spherical surface so that it does not interfere with the measurement of the interferometer. The intersection of the axis 27 of the interferometer beam and the front and rear surfaces of the sphere provide the two reference points $R^1$ and R for each way calibration.

Further refinements of the invention are possible. For example, the track may be motorized to enable automatic positioning of the artifact with feedback to the machine control so that the probe can be positioned in the correct place for making its measurements.

Alternatively the machine spindle may have a protrusion on it adapted to engage the artifact to position it along the track.

The track may be made in sections to be connected together and, to enable laser alignment to be readily achieved, may extend beyond the working volume of the machine to provide a greater separation between the laser and the artifact for alignment purposes.

Also after the laser has been aligned with the track the first time, it may be rigidly attached to the track so that it always remains in alignment allowing the first step of the method to be eliminated in subsequent calibrations.

The invention has been described above with reference to a measuring machine having a fixed worktable. However, the method of the invention can also be applied to measuring machines in which the worktable is movable and the machine spindle carrying the probe is fixed, with such a machine the steps requires to take the measurements are as follows:

1. After aligning the laser and the artifact, move the table to bring the second reference point on the artifact into contact with the probe. At this point set the interferometer reading and the scale reading to zero.
2. Move the table along the measurement axis by a given distance, say ten units. The scale reading will now be ten but the interferometer reading will still be zero.
3. Move the artifact along the track, back towards the probe by a distance of say nine units on the interferometer. The scale reading will still be ten but the interferometer reading will be nine.
4. Move the artifact into contact with the probe and take the reading of the scales and the interferometer when the probe triggers. The interferometer reading will now give the distance moved by the table accurately and can be compared with the reading of the scales.

In order to measure diagonals in the horizontal plane and in three dimensions the track along with the interferometer and the artifact mounted thereon, is mounted on a rotary table capable of tilting, to point the track in any direction. The track is thus preferably made from a stiff lightweight material such as carbon fibre.

A further alternative method of calibration involves the following steps:

1. Align the interferometric measuring apparatus with the artifact at two locations to define the measurement axis, and determine the positions of the nodal point in the machine frame of reference by measurement of the positions of the reference surfaces on the artifact as described above.
2. Using the probe, contact a reference point on the interferometer and set the machine scales to zero.
3. Position the artifact at its first position close to the interferometer and set the interferometer reading to zero.
4. Touch the measuring probe on the second reference point on the artifact to determine the distance d of the artifact from the zero point on the machine scales. Say this distance d is equal to one unit.
5. Move the artifact to its second position at say ten units on the scale and note the reading of the interferometer which should be nine units. This gives an accurate measure of the distance (L=9) moved by the artifact between the two positions.
6. Move the probe to contact the same reference point on the interferometer, and then move the probe to contact the second reference point on the artifact. The scale should now read ten units. By subtracting the initial distance d (=1 unit) from the scale reading, the scale reading should also be nine units and any difference is an error in the machine scale reading.
7. Move the artifact to a third position, a further ten units along the track. The interferometer will now read nineteen units.
8. Move the probe to contact the reference points on the interferometer and on the artifact as before. If no relative movement has taken place between the track and the worktable, the distance moved by the probe will be twenty units as measured by the scale, and after subtracting the initial one unit, the measured distance according to the machine should also be nineteen units, any difference being an error in the machine reading.

If however, there has been relative movement between the track and the worktable, there will be no difference in the interferometer reading because the interferometer, track and artifact are an integral unit. However, the reference point on the interferometer will have moved and, with the first described method of measurement, which simply took the difference in scale readings between two positions of the artifact, there would be an additional error in the machine reading. However by measuring the distance each time from a reference point on the interferometer and subtracting the distance d from the distance measured by the machine scales, the effect of relative movement between the track and the machine is eliminated.

Although the preferred embodiment of the invention has been described using a laser interferometer as the independent measuring apparatus, it will be apparent that other forms of independent measuring apparatus may be used.

The errors in the measuring performance of the machine may be stored in any convenient manner, for example in a computer program or look-up table, for correction of future measurements made by the machine.

I claim:

1. A method of calibrating the measuring performance of a machine having relatively movable parts on one of which is mounted a measuring probe, the method comprising the steps of:

mounting a measurement artifact on one of the machine parts for movement along a measurement axis relative to the machine part, making a measurement of the position of the artifact at each of a plurality of points on the axis with a measuring apparatus which is independent of the measuring probe, causing relative movement of the machine parts in order to make a measurement of the position of the artifact at each of said plurality of points using the measuring probe, and determining the distance between two of said plurality of points as measured by each of the measuring apparatus and the measuring probe, and providing an indication of the difference between the two determinations of the distance measured.

2. A method according to claim 1 and wherein the measurement artifact is an optical artifact which comprises a reflective surface, and the first measurement step includes the further steps of:

directing a beam of radiation from an interferometric measuring apparatus towards the reflective surface of the artifact and receiving a reflected beam from said surface on a detector of said apparatus.

3. A method according to claim 2 wherein the artifact is provided with at least one reference surface having a known relationship with a reference point associated with the reflecting surface, the method comprising the further steps of:

aligning the beam of radiation from the interferometric measuring apparatus with the reference point associated with the reflecting surface at two points spaced along a measurement direction to define the measurement axis for the calibration, with the artifact positioned at each of said two points, causing relative movement of the machine parts to bring the measuring probe into contact with said at least one reference surface in order to determine the position and direction of the measurement axis in the machine frame of reference, and making all probe measurements of the position of the artifact by causing relative movements of the machine parts parallel to the measurement axis.

4. A method according to claim 3 wherein the artifact is a corner-cube retro-reflector having a nodal point, and said at least one reference surface comprises a part-spherical surface centred on the nodal point, the method comprising the steps of:

aligning the beam of radiation from the interferometric measuring apparatus with the nodal point of the retro-reflector at said two points spaced along the measurement direction to define the measurement axis for the calibration, defining a reference point on the part-spherical surface, said reference point being the intersection of the part-spherical surface and the measurement axis, and making all probe measurements of the position of the artifact by causing relative movement of the machine parts along the measurement axis and making a single touch at the reference point on the part-spherical surface.

5. A method according to claim 1 and wherein the steps of measuring the positions of the artifact at different points along the measurement axis using the measuring probe each comprise the step of measuring the distance of the artifact at each point from a fixed datum on the machine.

6. A method according to claim 2 and wherein the steps of measuring the positions of the artifact at different points along the measurement axis using the measuring probe each comprise the step of measuring the distance of the artifact at each point from a datum point on the interferometric measuring apparatus.

7. A method according to claim 2 and wherein the step of determining the distance between said two of said plurality of points includes the further steps using the coefficient of linear expansion of a desired material to calculate from the distance measured by the interferometric measuring apparatus and the temperature of the machine, the length of such material at standard temperature and pressure which is represented by the measured distance, and using the calculated value to correct the distance measured by the measuring probe.

8. Apparatus for calibrating the measuring performance of a machine having two relatively movable parts and measuring devices for determining the relative movement of the parts, the apparatus comprising:

a track, means for mounting the track in a fixed relationship with one of the machine parts to define a desired calibration direction, a measurement artifact adapted to be mounted on the track for movement along the track, measuring apparatus for making a measurement of the position of the artifact at each of a plurality of points along the track, a measuring probe adapted to be mounted on the other of the relatively movable parts of the machine to make a measurement of the position of the artifact at each of said plurality of points along the track, means for determining the distance between two of said plurality of points as measured by the probe and by the measuring apparatus and for indicating any difference between the two determinations of the distance measured.

9. Apparatus according to claim 8 and wherein the measuring apparatus comprises a laser interferometer and the artifact is an optical artifact having a reflecting surface and at least one reference surface having a known relationship with the reference surface.

10. Apparatus according to claim 9 and wherein the optical artifact comprises a corner-cube retro-reflector having a nodal point and a part-spherical reference surface centred on the nodal point.

11. Apparatus according to claim 9 and wherein the artifact comprises a retro-reflector in the form of a glass sphere having a refractive index of 2 at the wavelength of the light emitted by the laser of the interferometer, and having a nodal point at the center of the sphere.

12. An optical artifact for use in the method according to claim 2 and comprising a corner-cube retro-reflector having a nodal point and a part-spherical reference surface centered on the nodal point.

13. An optical artifact for use in the method according to claim 2 in which the interferometric measuring apparatus is a laser interferometer, the artifact comprising a retro-reflector in the form of a glass sphere having a refractive index of 2 at the wavelength of the light emitted by the laser of the interferometer and having a nodal point at the center of the sphere.

* * * * *